United States Patent
Stark et al.

(10) Patent No.: US 6,874,329 B2
(45) Date of Patent: Apr. 5, 2005

(54) REFRIGERANT COOLED VARIABLE FREQUENCY DRIVE AND METHOD FOR USING SAME

(75) Inventors: Michael Alan Stark, Charlotte, NC (US); Cornelius Holmes, North Syracuse, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/448,861

(22) Filed: May 30, 2003

(65) Prior Publication Data

US 2004/0237554 A1    Dec. 2, 2004

(51) Int. Cl.$^7$ .............................. F25B 41/04; F25B 1/00; F25D 23/12

(52) U.S. Cl. .............................. 62/230; 62/222; 62/226

(58) Field of Search .................. 62/230, 226, 113, 62/222, 228.4, 259.2

(56) References Cited

U.S. PATENT DOCUMENTS

| | | | |
|---|---|---|---|
| 4,667,480 A | * | 5/1987 | Bessler ........................ 62/180 |
| 5,651,260 A | * | 7/1997 | Goto et al. ................... 62/126 |
| 6,116,040 A | | 9/2000 | Stark |
| 6,176,092 B1 | | 1/2001 | Butterworth et al. |
| 6,237,353 B1 | | 5/2001 | Sishtla et al. |
| 6,279,340 B1 | | 8/2001 | Butterworth et al. |
| 6,564,560 B2 | | 5/2003 | Butterworth et al. |
| 6,604,372 B2 | * | 8/2003 | Baumert et al. .............. 62/199 |
| 6,688,124 B1 | * | 2/2004 | Stark et al. ................... 62/222 |

* cited by examiner

*Primary Examiner*—Chen Wen Jiang
(74) *Attorney, Agent, or Firm*—Bachman & LaPointe

(57) ABSTRACT

A method for operating a vapor compression system having a compressor driven by a variable frequency drive, wherein the compressor feeds a refrigerant loop, wherein the refrigerant loop includes a cooling circuit for the variable frequency drive, and wherein a flow control member is positioned for controlling flow of refrigerant from the refrigerant loop to the cooling circuit including the steps of: sensing an operating temperature of the variable frequency drive; and controlling the flow control member based upon the operating temperature.

4 Claims, 2 Drawing Sheets

REFRIGERANT COOLED VARIABLE FREQUENCY DRIVE AND METHOD FOR USING SAME

BACKGROUND OF THE INVENTION

The invention relates to HVAC systems and, more particularly, to variable frequency drives used to operate components of such systems and methods for operating such drives.

Variable frequency drives (VFD) that are applied and produced today are designed and rated for the worst case ambient operating conditions. However, in the HVAC field, such drives can be refrigerant-cooled, and thus the drive operating conditions are independent of the ambient condition of the VFD.

While such systems advantageously provide productive and efficient machines, further improvements can be made so as to enhance efficiency and expand the operating envelope of vapor compression systems including variable frequency drives.

It is therefore the primary object of the present invention to provide such a system and method.

Other objects and advantages of the present invention will appear hereinbelow.

SUMMARY OF THE INVENTION

In accordance with the present invention, the foregoing objects and advantages have been readily attained.

In accordance wit the invention, a method is provided for operating a vapor compression system having a compressor driven by a variable frequency drive, wherein the compressor feeds a refrigerant loop, wherein the refrigerant loop includes a cooling circuit for the variable frequency drive, and wherein a flow control member is positioned for controlling flow of refrigerant from the refrigerant loop to the cooling circuit, wherein the method comprises the steps of sensing an operating temperature of said variable frequency drive; and controlling said flow control member based upon said operating temperature.

In further accordance with the invention, a vapor compression system is provided, which comprises a compressor driven by a variable frequency drive, said compressor being communicated with a refrigerant loop, said loop including a cooling circuit for said variable frequency drive and a flow control member for controlling flow of refrigerant from said refrigerant loop to said cooling circuit; and a control member adapted to sense an operating temperature of said variable frequency drive and to control said flow control member based upon said operating temperature.

BRIEF DESCRIPTION OF THE DRAWINGS

A detailed description of preferred embodiments of the present invention follows, with reference to the attached drawings, wherein.

DETAILED DESCRIPTION

The invention relates to an HVAC system and, more particularly, to a vapor compression system having a variable frequency drive for driving a component of same, typically the compressor.

In accordance with the invention, the variable frequency drive, or VFD, is cooled with refrigerant in a refrigerant loop, and the amount of coolant and temperature or cooling capacity of same are controlled based upon temperature sensing at the heat sink of the variable frequency drive.

In accordance with the present invention, and advantageously, coolant is increased to the cooling circuit to keep the heat sink within a desired temperature range. Once the refrigerant can no longer cool the variable frequency drive heat sink to within a desired operating range, a power rating of the VFD is reduced. At this point, the capacity of the chiller is reduced only if the operating power of same exceeds the reduced power rating of the drive.

This advantageously serves to expand the operating parameters of the system and only restricts operation or capacity of the chiller when absolutely needed.

Figure 1:
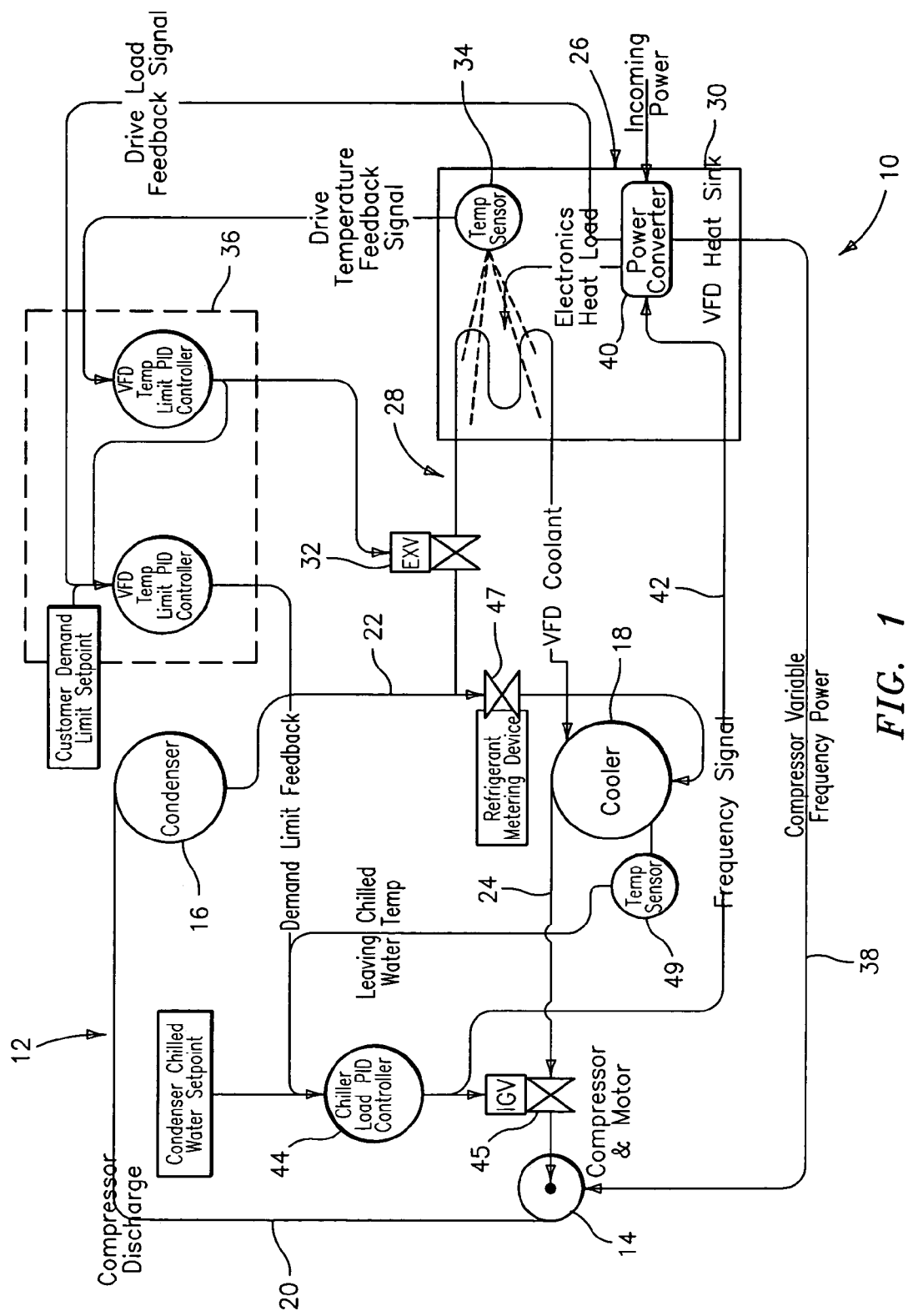
FIG. 1 schematically illustrates a system in accordance with the present invention.

Turning now to the drawings, FIG. 1 shows a system 10 in accordance with the present invention including a vapor compression system 12 having a compressor 14, a condenser 16 and a cooler 18 serially connected by lines 20, 22 and 24 defining a refrigerant loop for refrigerant flow between these components. In accordance with the invention, compressor 14 is driven by a variable frequency drive 26, and a coolant circuit 28 is advantageously associated with vapor compression system 12, in this instance line 22, to convey a portion of coolant to the variable frequency drive heat sink 30 as desired.

Coolant circuit 28 is advantageously communicated through a flow control member such as an expansion device 32 for use in controlling the cooling capacity of coolant passed through cooling circuit 28 to variable frequency drive heat sink 30 as will be further discussed below.

As shown in FIG. 1, coolant circuit 28 can pass through variable frequency drive heat sink 30 and then flow back to cooler 18.

In further accordance with the invention, temperature of variable frequency drive heat sink 30 is periodically or continuously monitored, for example using a temperature sensor 34, and this information is conveyed to components of a control system 36 advantageously adapted to control operation of system 10 based upon the temperature detected by temperature sensor 34.

Control unit 36 is adapted to perform several functions. One of these functions is to control expansion device 32 so as to enhance the cooling capacity of coolant within coolant circuit 28 when needed. Thus, in one function or capacity, control unit 36 is programmed with a desired operation range or upper limit of temperature for variable frequency drive heat sink 30, and when the temperature of heat sink 30 exceeds the upper limit or some other trigger temperature, control unit 36 is adapted to operate expansion device 32 to increase coolant capacity within coolant circuit 28 and thereby attempt to bring the temperature of variable frequency drive heat sink 30 to within a desired range, for example to a temperature below the upper limit or trigger temperature.

Control unit 36 is also advantageously adapted to control the power rating of variable frequency drive 26, and therefore the amount of power which can be provided to compressor 14 as schematically illustrated at line 38.

Control unit 36 is also advantageously adapted to sense power rating of variable frequency drive 26 and the power demanded by compressor 14, and to cutback operation of compressor 14 when the power demanded exceeds the power rating of variable frequency drive 26.

Still referring to FIG. 1, variable frequency drive 26 can advantageously be provided with a power converter 40 which is adapted to receive a frequency signal 42 from the chiller load PID controller 44. Power converter 40 serves to receive incoming power and, based upon input from control unit 36, convert the incoming power to the suitable power for compressor variable frequency power 38 as desired.

Control unit 36 can also advantageously be communicated, for example through PID controller 44, with an IGV controller 45 for controlling guide vanes within compressor 14 as will be further discussed below.

A refrigerant metering device 47 is incorporated into the refrigerant loop, and serves to meter flow of refrigerant to the evaporator.

A temperature sensor 49 can also advantageously be associated with cooler 18 and the control mechanism, for example with PID controller 44, as shown.

It should be noted that expansion device 32 is preferably an electronic expansion device, or EXV, as such a device is particularly advantageous in connection with the present invention. Other flow control mechanisms can also be used.

In accordance with the foregoing, a system is provided which incorporates automatic control of expansion device 32 and thereby allows for control of cooling capacity delivered to the variable frequency drive, and particularly variable frequency drive heat sink 30, when needed. This in itself is advantageous and serves to expand the operating envelope of variable frequency drive 26. Further, in accordance with the invention, once the temperature of variable frequency drive heat sink 30 exceeds the desired operating temperature, and no additional cooling capacity can be passed through coolant loop 28, the power rating of the variable frequency drive is reduced. At this point, the reduced power rating may still be able to supply the needs of compressor 14. Thus, and advantageously, under those circumstances, operation of compressor 14 is not restricted. Only if power demands of the compressor exceed the limited power rating of variable frequency drive 26 is the operation of compressor 14 restricted.

Figure 2:
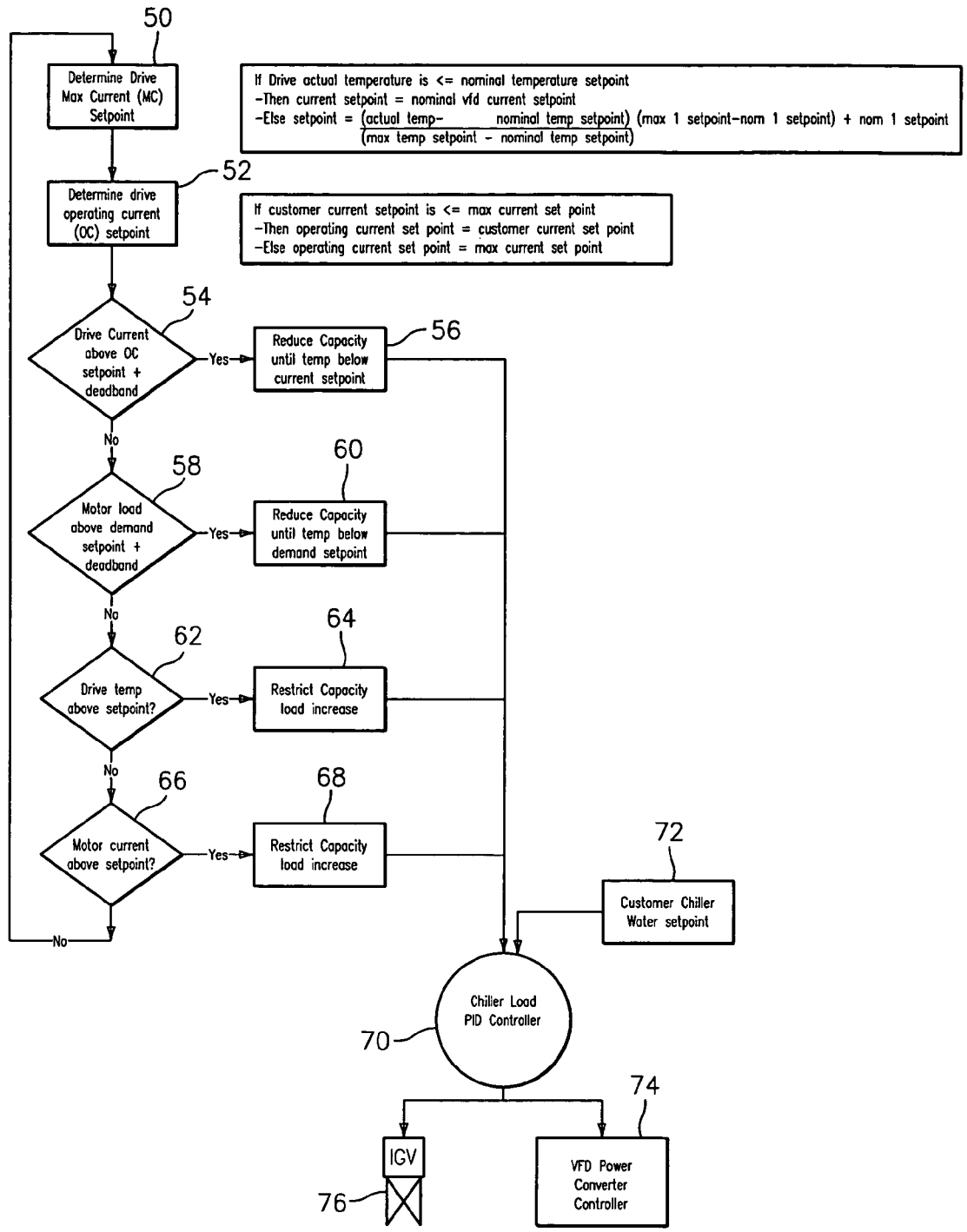
FIG. 2 is a flowchart illustrating steps of the process of the present invention.

Turning now to FIG. 2, a flowchart is provided for illustration of operation of the system in accordance with the present invention.

Starting at the top, box 50 shows a determination of the drive maximum current set point. Box 52 illustrates the next step, which is determination of the drive operating current set point. In comparison step 54, a determination is made as to whether the drive current is above the operating current set point. If so, action box 56 shows the step of reducing capacity until temperature is below the current set point.

If the decision from step 54 is no, that is, the drive current is not above the OC set point, then another comparison 58 is made to determine whether the motor load is above the demand set point. If so, action step 60 shows reduction in capacity until the temperature is below the demand set point. In the meantime, if the motor load is not above the demand set point, then the process proceeds to decision box 62 wherein a determination is made as to whether the drive temperature is above the set point. If yes, action box 64 shows the step of restricting capacity for load increase.

If the drive temperature is not above the current set point in decision step 62, then comparison step 66 determines whether motor current is above the set point. If yes, then again the capacity for load increase is restricted in action step 68. If the motor current is not above the current set point as determined in step 66, then the decision process begins again with determination step 50.

Still referring to FIG. 2, the resulting action steps 56, 60, 64 and 68 are all passed to a chiller load PID controller 70, along with the desired customer chiller water set point 72, to result in appropriate control actions for VFD power converter controller 74 and IGV controller 76.

It should be readily apparent in accordance with the present invention that a system and method have been provided for advantageously expanding operating envelope of a HVAC system such as a vapor compression system utilizing a variable frequency drive, such that circumstances under which chiller capacity is reduced are minimized, and capacity of the system to operate at desired levels is expanded.

This is accomplished through the use of a controller which performs several functions. First, the controller controls position of the electronic expansion valve to control delivery of coolant to the heat sink of the variable frequency drive. Second, the controller conveys the average base plate temperature to the variable frequency drive temperature limit PID controller resulting in suitable control of the system as described above.

When the VFD cooling system can no longer maintain the heat sink temperature, logic in the controller will adjust the power rating of the VFD, possibly causing a reduction in capacity of the VFD. The capacity of the chiller is only limited or reduced if the power rating of the drive, based upon the sink temperature, is exceeded by the operating power of the chiller. The capacity of the chiller is reduced by changing the control set point of the chiller load PID controller, which will typically result in either IGV controller closing some of the compressor internal guide vanes or the frequency of the VFD being reduced.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A method for operating a vapor compression system having a compressor driven by a variable frequency drive, wherein said compressor feeds a refrigerant loop, wherein said refrigerant loop includes a cooling circuit for said variable frequency drive, and wherein a flow control member is positioned for controlling flow of refrigerant from said refrigerant loop to said cooling circuit, comprising the steps of:

sensing an operating temperature of said variable frequency drive; and controlling said flow control member based upon said operating temperature, further comprising selecting a set point temperature for said variable frequency drive, and controlling said flow control member to increase refrigerant flow to said cooling circuit when said operating temperature exceeds said set point temperature, wherein said flow control member has a maximum setting corresponding to a maximum flow of refrigerant to said cooling circuit, and further comprising reducing a power rating of said variable frequency drive when said operating temperature exceeds said set point temperature and said flow control member is at said maximum setting.

2. The method of claim 1, wherein said flow control member is an electronically controllable expansion valve.

3. A vapor compression system, comprising:

a compressor driven by a variable frequency drive, said compressor being communicated with a refrigerant loop, said loop including a cooling circuit for said variable frequency drive and a flow control member for controlling flow of refrigerant from said refrigerant loop to said cooling circuit; and a control member adapted to sense an operating temperature of said variable frequency drive, and to control said flow control member based upon said operating temperature, wherein said control member has a stored set point temperature, and is further adapted to control said flow control member to increase refrigerant flow to said cooling circuit when said operating temperature exceeds said set point temperature, wherein said flow control member has a maximum setting corresponding to a maximum flow of refrigerant to said cooling circuit, and wherein the control member is further adapted to reduce a power rating of said variable frequency drive when said operating temperature exceeds said set point temperature and said flow control member is at said maximum setting.

4. The system of claim 3, wherein said flow control member is an electronically controllable expansion valve.

* * * * *